United States Patent
Duguet et al.

(10) Patent No.: US 7,967,368 B2
(45) Date of Patent: Jun. 28, 2011

(54) MOTOR VEHICLE DOOR WHICH IS REINFORCED AGAINST SIDE IMPACTS

(75) Inventors: Eric Duguet, Paris (FR); Daniel Plantier, Bois d'Arcy (FR)

(73) Assignee: Renault S.A.S., Boulogne-Billancourt (FR)

( * ) Notice: Subject to any disclaimer, the term of this patent is extended or adjusted under 35 U.S.C. 154(b) by 423 days.

(21) Appl. No.: 11/995,113

(22) PCT Filed: Jun. 12, 2006

(86) PCT No.: PCT/FR2006/050546
§ 371 (c)(1),
(2), (4) Date: Mar. 4, 2008

(87) PCT Pub. No.: WO2007/006986
PCT Pub. Date: Jan. 18, 2007

(65) Prior Publication Data
US 2010/0060031 A1    Mar. 11, 2010

(30) Foreign Application Priority Data
Jul. 12, 2005    (FR) ...................................... 05 07462

(51) Int. Cl.
B60J 5/04    (2006.01)

(52) U.S. Cl. .................................................. 296/146.6

(58) Field of Classification Search ............... 296/146.1, 296/146.5, 146.6, 209, 187.12; 49/502
See application file for complete search history.

(56) References Cited

U.S. PATENT DOCUMENTS

| | | | |
|---|---|---|---|
| 3,788,686 A * | 1/1974 | Rossie et al. | 296/146.6 |
| 3,819,228 A | 6/1974 | Cornacchia | |
| 4,306,381 A * | 12/1981 | Presto | 49/502 |
| 4,307,911 A * | 12/1981 | Pavlik | 296/187.12 |
| 4,685,722 A | 8/1987 | Srock | |
| 5,029,934 A | 7/1991 | Schrader et al. | |
| 7,097,742 B2 * | 8/2006 | Furuse | 296/146.6 |
| 7,300,097 B2 * | 11/2007 | Nakagawa | 296/146.6 |

FOREIGN PATENT DOCUMENTS

| | | |
|---|---|---|
| EP | 1 468 855 | 10/2004 |
| FR | 2 418 111 | 9/1979 |
| WO | 2005 061251 | 7/2005 |

* cited by examiner

*Primary Examiner* — H Gutman
(74) *Attorney, Agent, or Firm* — Oblon, Spivak, McClelland, Maier & Neustadt, L.L.P.

(57) ABSTRACT

A motor vehicle door including an outer panel and an inner shell panel that are interconnected at the lower ends thereof by a door sill plate that extends transversely in relation to the two panels. The door sill plate is reinforced with a reinforcing element that is fixed to the plate and that extends along most of the length and width thereof.

9 Claims, 2 Drawing Sheets

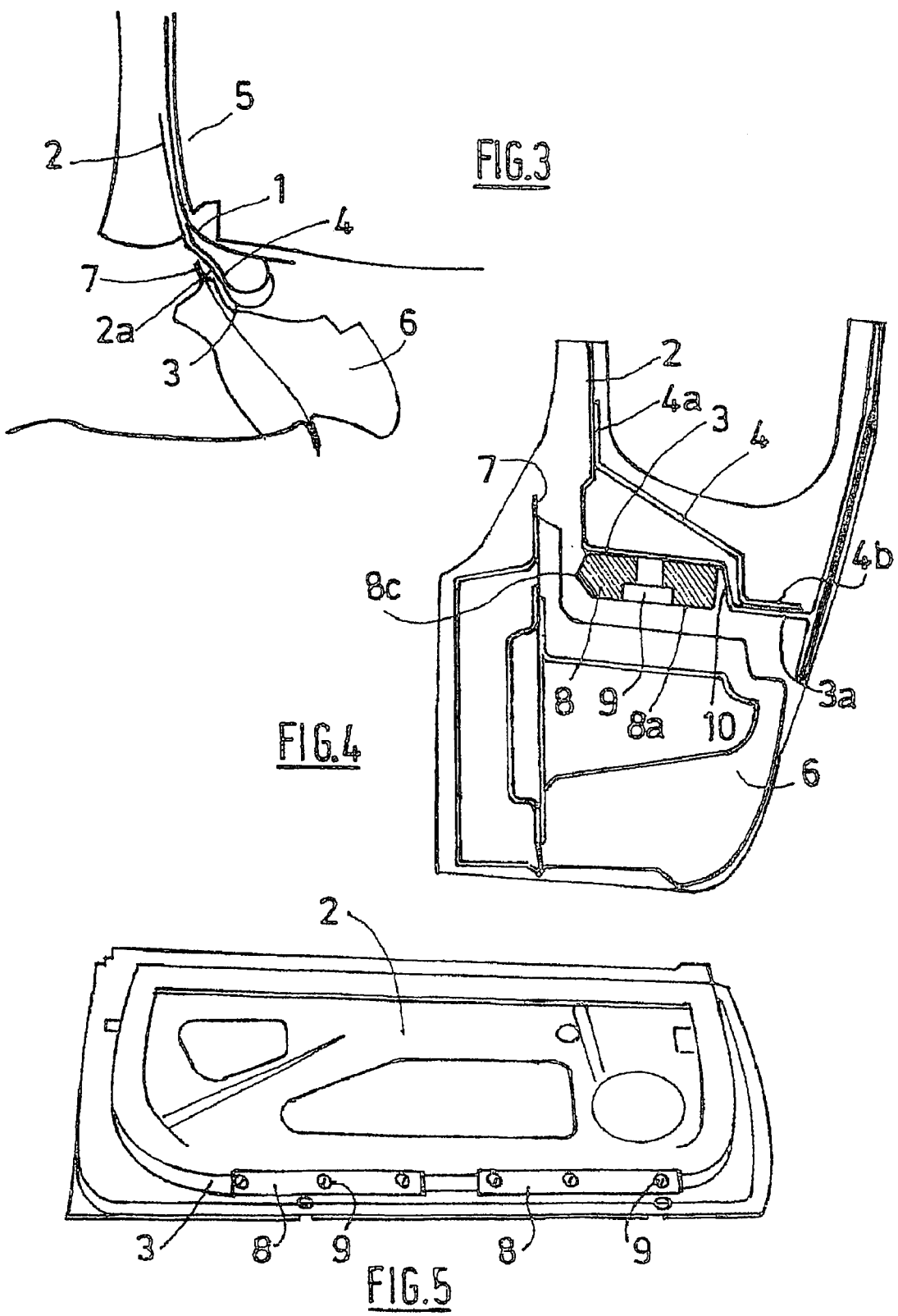

MOTOR VEHICLE DOOR WHICH IS REINFORCED AGAINST SIDE IMPACTS

BACKGROUND

The present invention relates to a vehicle door reinforced against side impacts.

It is known that motor vehicle doors generally comprise an outer panel and an inner box-section panel which are interconnected at their lower portion by a door bottom wall extending transversely with respect to the two panels.

These doors offer relatively low resistance to side impacts.

To overcome this drawback, motor vehicle doors are often reinforced by reinforcing bars which extend behind the outer panel of the door and are situated virtually halfway up the door.

However, these reinforcing bars are insufficient to prevent the door from opening toward the inside of the vehicle during a side impact at a speed below 60 km/h.

This opening of the door toward the inside of the vehicle is harmful to the passengers.

This opening is due to the fact that the lower portion of the door situated below the aforementioned reinforcing bars has inadequate strength. Specifically, this inadequate strength allows said portion to deform by passing above the rebate of the vehicle sill box-section. Since the lower portion of the door is no longer retained by this rebate, the door can open inwardly, seriously injuring, or even killing, the passengers.

BRIEF SUMMARY

The object of the present invention is to overcome this drawback by reinforcing the lower portion of motor vehicle doors.

According to the invention, the motor vehicle door comprising an outer panel and an inner box-section panel which are interconnected at their lower portion by a door bottom wall extending transversely with respect to the two panels, is characterized in that said door bottom wall is reinforced by a reinforcing element fastened to this wall and extending along a major portion of the length and the width of this wall.

According to one version of the invention, said reinforcing element consists of at least one metal plate having a greater thickness than said door bottom wall.

In a first embodiment of the invention, said reinforcing element is a metal plate of which one of the longitudinal edges is fastened against the internal face of the inner box-section panel and of which the other longitudinal edge is fastened against the internal face of the door bottom wall, close to the outer panel.

Preferably, said plate forms an acute angle with the inner box-section panel and with the door bottom wall and has, on each of its longitudinal edges, an edge strip which is folded parallel to the wall to which it is fastened.

Tests have shown that this plate prevented the door from opening inwardly in the event of side impacts occurring at average speeds.

In a second embodiment of the invention, said reinforcing element comprises at least one bar fastened against the external face of the door bottom wall.

According to other specific features of this second embodiment:

said bar is fastened in a recess stamped in said door bottom wall, such that the outer face of said bar is situated substantially in the continuation of that part of the door bottom wall situated outside said recess;

one of the longitudinal edges of the bar is situated substantially in the continuation of the internal box-section wall so as to be situated opposite the rebate formed in the vehicle sill box-section when the door is closed.

Preferably, said longitudinal edge has a cross section in the form of a point which is designed to be able to penetrate into the adjacent rebate of the sill in the event of a side impact on the door.

This arrangement affords increased protection in the event of a side impact by even further reducing the risks of the door opening toward the inside of the vehicle.

In an even more preferred embodiment of the invention, the bottom of the door is reinforced both by at least one plate of the above-described type and by at least one bar as described above.

BRIEF DESCRIPTION OF THE DRAWINGS

Other particular features and advantages of the invention will become more apparent from the description which follows.

In the appended drawings which are given by way of non-limiting examples:

FIG. 3 is a similar view to FIG. 2, showing the deformation of the door under the effect of a side impact, FIG. 4 is a view in cross section through a door and through the vehicle sill box-section, the door bottom wall being reinforced by a bar, FIG. 5 is a view of the internal face of a door and of the door bottom wall reinforced by two bars.

DETAILED DESCRIPTION

Figure 1:
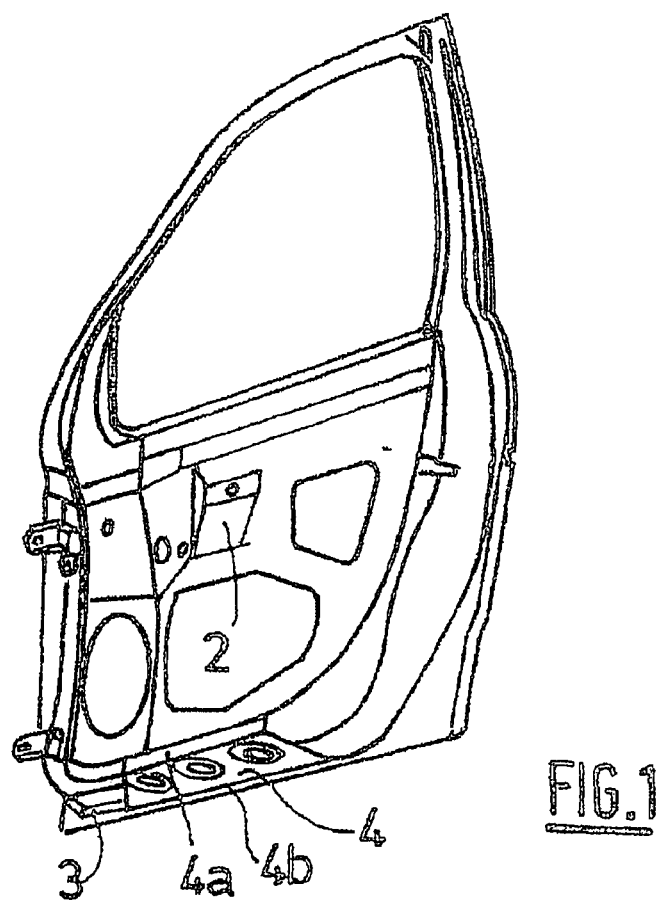
FIG. 1 is a perspective view of a motor vehicle door whose outer panel has been removed, showing an element for reinforcing the door bottom wall.
Figure 2:
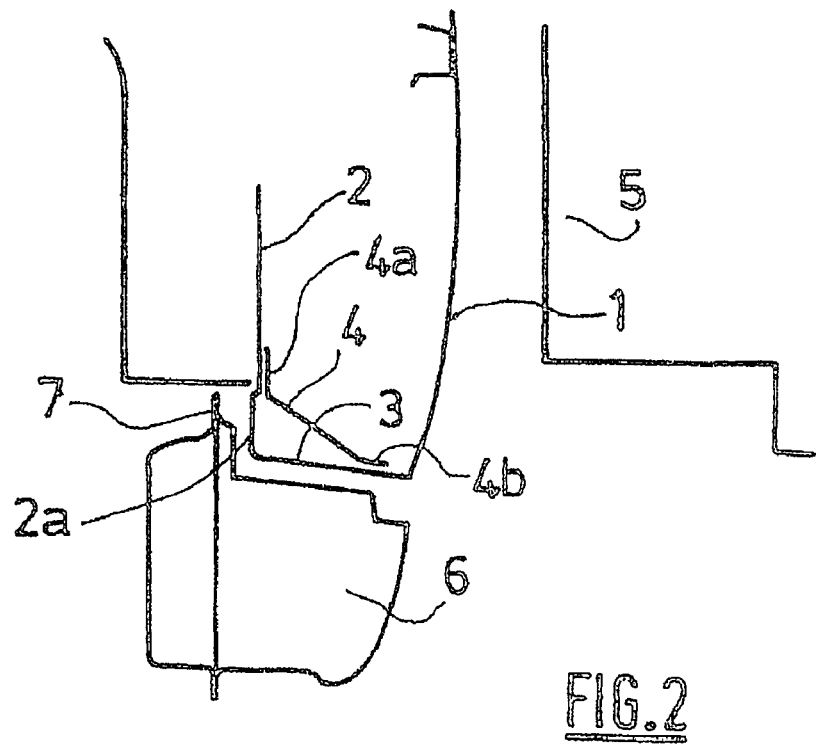
FIG. 2 is a view in cross section through a motor vehicle door comprising the reinforcing element and through the vehicle sill box-section.

In the embodiment represented in FIGS. 1 and 2, the motor vehicle door comprises an outer panel 1 (removed in FIG. 1) and an inner box-section panel 2 which are interconnected at their lower portion by a door bottom wall 3 extending transversely with respect to the two panels 1, 2. According to the invention, said door bottom wall 3 is reinforced by a reinforcing element 4 fastened to this wall 3 and extending along a major portion of the length and the width of this wall 3, covering the central region thereof.

In this example, this reinforcing element 4 consists of a metal, for example steel or aluminum, plate which preferably has a greater thickness than the door bottom wall 3.

As is shown by FIGS. 1 and 2, particularly FIG. 2, the reinforcing element 4 is a metal plate of which one 4a of the longitudinal edges is fastened, preferably by welding, against the internal face of the inner box-section panel 2 and of which the other longitudinal edge 4b is fastened in the same way against the internal face of the door bottom wall 3, close to the outer panel 1.

In the example represented in FIG. 2, the plate 4 forms an acute angle with the inner box-section panel 2 and with the door bottom wall 3 and has, on each of its longitudinal edges, an edge strip which is folded parallel to the wall 2 or 3 to which it is fastened. The plate 4 thus forms a bracket which reinforces the lower portion of the door.

FIG. 3 shows the deformation experienced as a result of a side impact applied by a barrier 5 moving at a speed of around 60 km/h.

This barrier 5 moves above the vehicle sill box-section and in particular above the rebate 7 which is opposite the lower portion 2a of the box-section wall 2 of the door.

It can be seen from FIG. 3 that the door and the sill box-section 6 are folded toward the inside of the vehicle but the lower portion 2a of the box-section wall 2 of the door remains pressed against the rebate 7. The door has not opened.

This result can be explained by the presence of the reinforcing plate 4, which significantly increases the resistance of the lower portion of the door to the deformation occurring in the event of a side impact.

In the embodiment represented in FIGS. 4 and 5, the reinforcing element comprises two metal bars 8 which are fastened, by means of screws 9, against the external face of the door bottom wall 3.

In this example, the bars 8 are fastened in a recess 10 stamped in the door bottom wall 3, such that the outer face 8a of the bars 8 is situated substantially in the continuation of that part 3a of the door bottom wall 3 situated outside the recess 10.

Moreover, one 8b of the longitudinal edges of the bars 8 is situated substantially in the continuation of the lower portion 2a of the internal box-section wall 2 so as to be situated opposite the lower portion of the rebate 7 formed in the vehicle sill box-section 6 when the door is closed.

Furthermore, the longitudinal edge 8b of the bars 8 has a cross section in the form of a point 8c which is designed to be able to penetrate into the adjacent rebate 7 of the sill 6 in the event of a side impact on the door.

In the example represented in FIG. 4, the lower portion of the door comprises not only the reinforcing bars 8 but also the reinforcing plate 4 described with reference to FIGS. 1 to 3.

The simultaneous presence of the reinforcing plate 4 and of the bars 8 provides the lower portion of the door with an increased resistance to side impacts.

In the event of a side impact, the pointed ridge 8c of the bars 8 becomes embedded in the rebate, thereby even further preventing the risk of the door opening toward the inside of the vehicle.

The double reinforcement above is particularly suited to two-door vehicles each having a relatively long length, that is to say a length which is sensitive to side impacts, as in the case of coupés.

The invention claimed is:

1. A motor vehicle door comprising:
an outer panel and an inner box-section panel that are connected at their lower portion by a door bottom wall extending transversely with respect to the two panels, and a door sill box,
wherein a first reinforcing element is fastened to an inside of the door bottom wall and extends along a major portion of the length and the width of the door bottom wall, and a second reinforcing element is fastened to an outside of the door bottom wall and includes a cross section in a form of a point that is configured to penetrate into a rebate formed in the door sill box during a side impact on the door.

2. The motor vehicle door as claimed in claim 1, wherein the first reinforcing element includes at least one metal plate having a greater thickness than the door bottom wall.

3. The motor vehicle door as claimed in claim 1, wherein the first reinforcing element is a metal plate of which one longitudinal edge is fastened against an internal face of the inner box-section panel and of which another longitudinal edge is fastened against an internal face of the door bottom wall, close to the outer panel.

4. The motor vehicle door as claimed in claim 3, wherein the metal plate forms a first acute angle with the inner box-section panel and a second acute angle with the door bottom wall and includes, on each of the longitudinal edges of the metal plate, an edge strip that is folded parallel to the wall to which the edge strip is fastened.

5. The motor vehicle door as claimed in claim 1, wherein the second reinforcing element comprises at least one bar fastened against an external face of the door bottom wall.

6. The motor vehicle door as claimed in claim 5, wherein the at least one bar is fastened in a recess stamped in the door bottom wall, such that an outer face of the at least one bar is situated substantially in a continuation of a part of the door bottom wall situated outside the recess.

7. The motor vehicle door as claimed in claim 6, wherein one longitudinal edge of the at least one bar is situated substantially in a continuation of an internal box-section wall so as to be situated opposite the rebate formed in the vehicle door sill box.

8. A motor vehicle door comprising:
an outer panel,
an inner box-section panel,
a door bottom wall connected to the outer panel and the inner box-section panel by extending transversely with respect to the panels,
a first reinforcing element extending along a major portion of a length and a width of the door bottom wall and of greater thickness than the door bottom wall, wherein the first reinforcing element is fastened to the door bottom wall and contained entirely within a cavity formed by the outer panel, the inner box-section panel and the door bottom wall, and
a second reinforcing element fastened to an outside of the door bottom wall, wherein the second reinforcing element includes a cross section in a form of a point that is configured to penetrate into a rebate formed in a door sill box during a side impact on the door.

9. The motor vehicle door as claimed in claim 8, wherein said first reinforcing element includes a metal plate forming a first acute angle with the inner box-section panel and a second acute angle with the door bottom wall, said metal plate includes a first edge strip running parallel and fastened to the inner box-section panel and a second edge strip running parallel and fastened to the door bottom wall, said edge strips being shorter in width than the metal plate.

* * * * *